United States Patent [19]

Shiobara et al.

[11] Patent Number: 5,306,748
[45] Date of Patent: Apr. 26, 1994

[54] FLUORINE-MODIFIED THERMOSETTING RESIN AND THERMOSETTING RESIN COMPOSITION

[75] Inventors: Toshio Shiobara; Hisashi Shimizu; Manabu Narumi, all of Annaka, Japan

[73] Assignee: Shin-Etsu Chemical Co., Ltd., Tokyo, Japan

[21] Appl. No.: 921,251

[22] Filed: Jul. 29, 1992

[30] Foreign Application Priority Data

Jul. 31, 1991 [JP] Japan ................................. 3-214676
Oct. 15, 1991 [JP] Japan ................................. 3-295209

[51] Int. Cl.$^5$ ................... C08G 59/00; C08G 8/04; C08G 14/04
[52] U.S. Cl. ................... 523/443; 523/466; 525/481; 525/482; 525/507; 528/97; 528/153; 549/546; 549/547; 549/559; 568/718; 568/719; 568/720; 568/722; 568/729

[58] Field of Search ............... 525/507, 481, 482; 528/97, 153; 549/546, 547, 559; 568/718, 719, 720, 722, 729; 523/443, 466

[56] References Cited

FOREIGN PATENT DOCUMENTS 62-187752 8/1987 Japan .
3-163128 7/1991 Japan .

*Primary Examiner*—Frederick Krass
*Attorney, Agent, or Firm*—Birch, Stewart, Kolasch & Birch

[57] ABSTRACT

Fluorine-modified thermosetting reins are available as phenolic or epoxy resins having trifluoromethyl groups and a naphthalene skeleton in a molecule. They are useful as components of resin compositions or resin modifiers and cure to products having low water pickup, low coefficient of thermal expansion, and adhesion as well as heat resistance and mechanical strength. Thermosetting resin compositions having such a thermosetting resin blended therein are useful in semiconductor element packaging.

17 Claims, 4 Drawing Sheets

FLUORINE-MODIFIED THERMOSETTING RESIN AND THERMOSETTING RESIN COMPOSITION

This invention relates to a fluorine-modified thermosetting resin which is a useful epoxy resin or phenolic resin for use as components of various resin compositions or modifiers for various resins. It also relates to a thermosetting resin composition having the thermosetting resin blended therein.

BACKGROUND OF THE INVENTION

Thermosetting resins are widely used in a variety of electric and structural materials which are subject to casting, impregnation, lamination and molding. More rigorous requirements are now imposed on these materials in various applications. In particular, heat resistance and low moisture absorption are important factors for such materials.

Among prior art thermosetting resins, epoxy resins and phenolic resins were most useful. Known polyepoxy compounds for heat resistance purposes include phenol novolak epoxidized compounds (e.g., Epikote 154 commercially available from Yuka Shell Epoxy K. K.), cresol novolak epoxidized compounds (e.g., EOCN commercially available from Nippon Kayaku K. K.), methylenedianiline tetraepoxide, and epoxidized tri- and tetra(hydroxyphenyl)alkane compounds. Also known phenolic resins include phenol novolak resins, ortho-cresol novolak resins, resins of bisphenol-A and triphenolmethane, etc.

Cured products resulting from these resins exhibit heat resistance which is relatively high, but not fully satisfactory. Also, such resins undesirably require high temperature and long heating time in order to acquire a practically acceptable strength and are not satisfactorily easy to process. For semiconductor encapsulation purposes, not only are heat resistance, low moisture absorption and good processability required, but low coefficients of thermal expansion and firm adhesion are also needed.

In the prior art, thermosetting resin compositions comprising an epoxy resin, a phenolic resin as a curing agent for the epoxy resin, and an inorganic filler have been used for semiconductor packaging. A number of problems must be overcome in order to meet the recent requirement of thickness reduction of semiconductor packages. For example, when flat packages are mounted on printed wiring boards, the packages are immersed in a solder bath at elevated temperature. On solder immersion, cracks can occur in packages of conventional thermosetting resin compositions due to thermal shocks. If the flat packages have absorbed moisture before mounting on printed wiring boards, steam explosion can occur in the packages upon immersion in a hot solder bath, also inducing cracks.

Approaches for overcoming such problems are taken from both the frame and packaging resin aspects. As to the resin, improvements are needed in moisture absorption, coefficient of thermal expansion, and adhesion to frames as 7ell as mechanical strength and glass transition temperature.

SUMMARY OF THE INVENTION

Therefore, an object of the present invention is to provide a thermosetting resin which is a useful epoxy resin or phenolic resin for use as a component of various resin compositions or a modifier for various resins and which is easy to process and cures to products having heat resistance, high mechanical strength, high glass transition temperature, low coefficients of thermal expansion, low moisture absorption and improved adhesion.

Another object of the present invention is to provide a thermosetting resin composition which cures to products having high mechanical strength, high glass transition temperature, low coefficients of thermal expansion, low moisture absorption and improved adhesion.

A further object is to provide such cured products.

According to a first aspect of the present invention, there is provided a thermosetting resin of the following general formula (1) or (2):

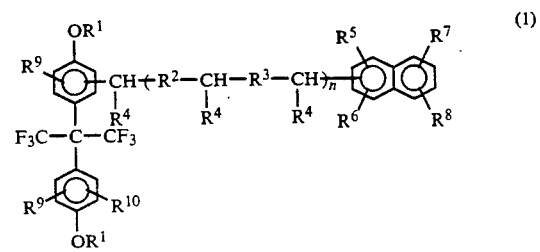

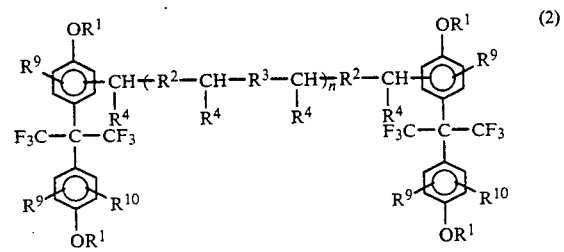

wherein $R^1$ is $$-H \text{ or } -CH_2-CH\underset{\diagdown O \diagup}{-}CH_2,$$

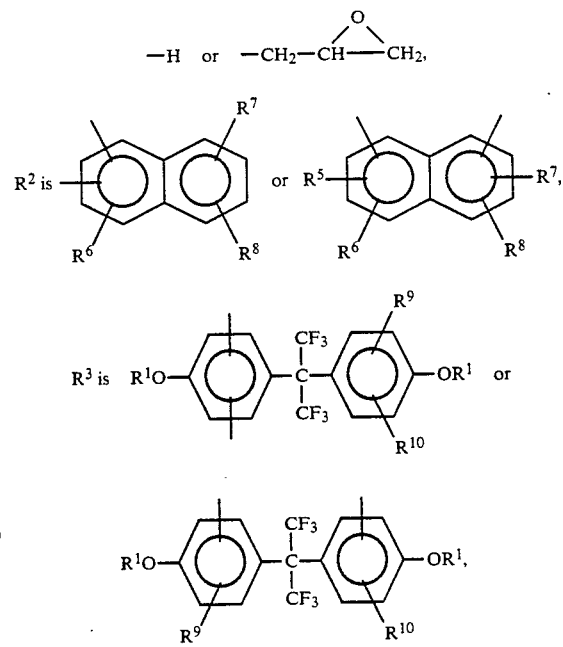

$R^4$ is —H or a monovalent organic group having 1 to 20 carbon atoms, $R^5$, $R^6$, $R^7$ and $R^8$ are independently

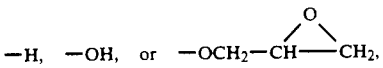

with the proviso that at least one of $R^5$, $R^6$, $R^7$, and $R^8$ is

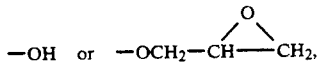

$R^9$ and $R^{10}$ are independently

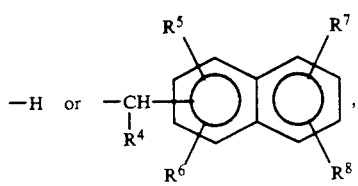

and n is 0 or an integer of from 1 to 7.

According to a second aspect of the present invention, there is provided a thermosetting resin composition comprising the fluorine-modified resin of formula (1) or (2). More particularly, the composition includes an epoxy resin, a phenolic resin, an inorganic filler, and a fluorine-modified resin of formula (1) or (2) as an epoxy resin and/or phenolic resin. Cured products obtained by thermosetting the thermosetting resin composition are also contemplated.

The thermosetting resin of the invention is easy to process and highly reactive with other epoxy resins, phenolic resins or the like, and itself cures to products having heat resistance over a long term, high mechanical strength at elevated temperature, high hardness, low coefficients of thermal expansion, low moisture absorption and improved adhesion. Therefore, the thermosetting resin is a useful epoxy resin or phenolic resin for use as a component of various resin compositions or a modifier for various resins.

Due to the inclusion of such a thermosetting resin, the thermosetting resin composition of the invention cures to products having low moisture absorption, low coefficients of thermal expansion, and improved adhesion while retaining the glass transition temperature of the epoxy resin. Therefore, the composition may find best use in semiconductor packaging.

DETAILED DESCRIPTION OF THE INVENTION

Figure 1:
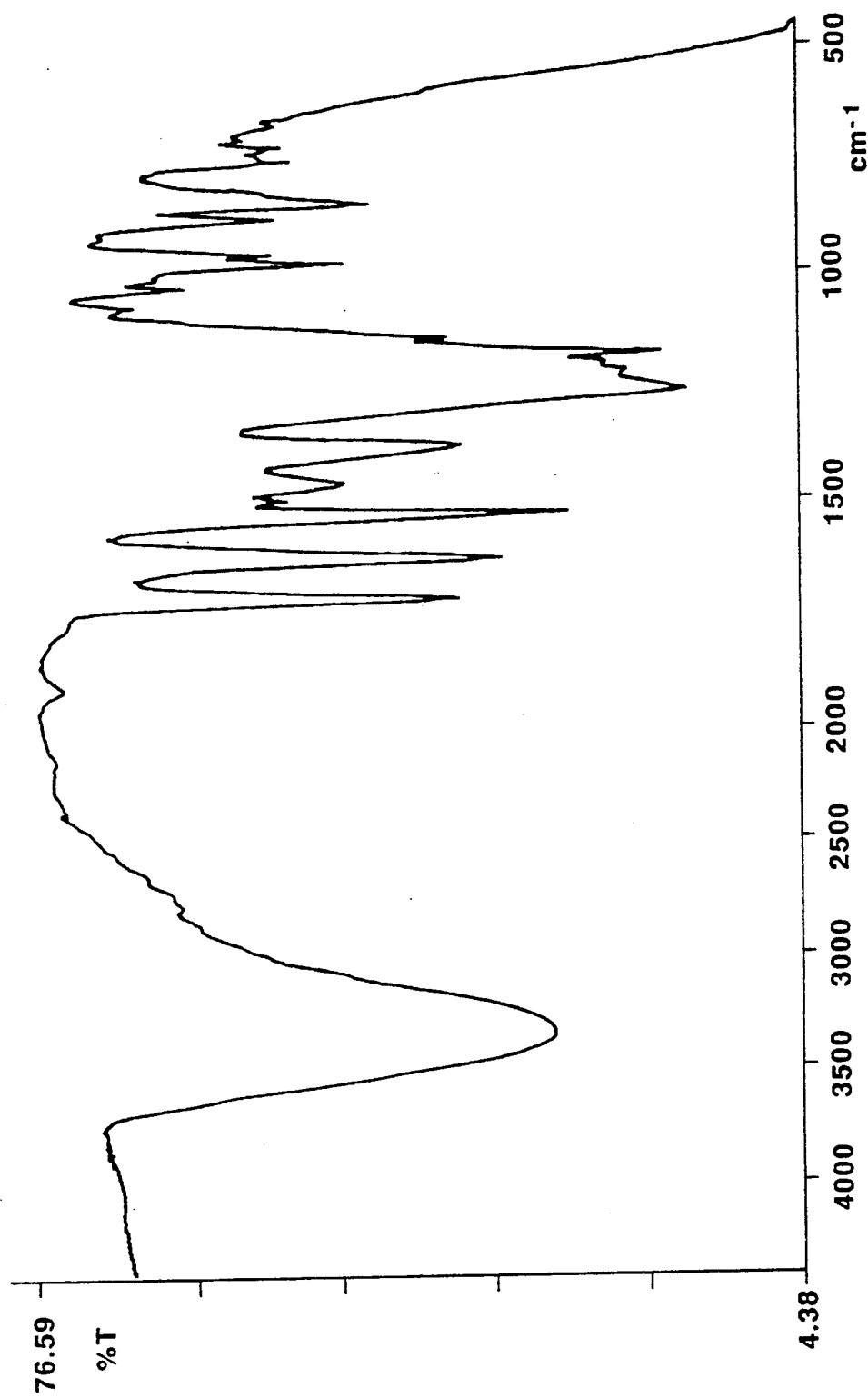
FIG. 1 is an IR chart of a phenolic resin according to the present invention designated Compound A in Example 1.

The thermosetting resin of the present invention is of the following general formula (1) or (2).

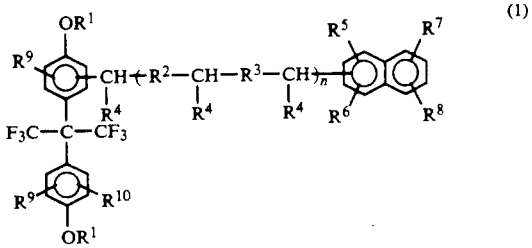

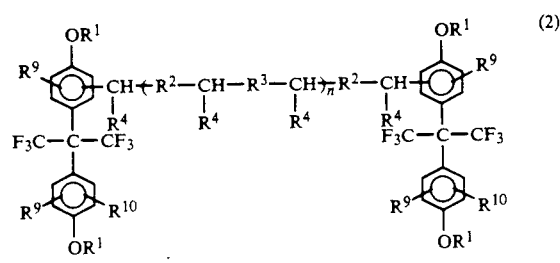

In the formulae, $R^1$ is

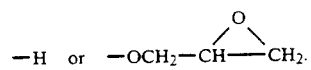

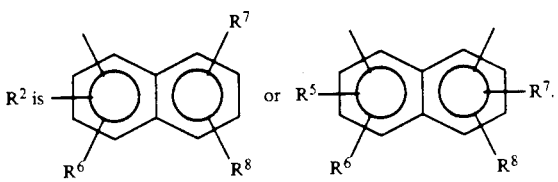

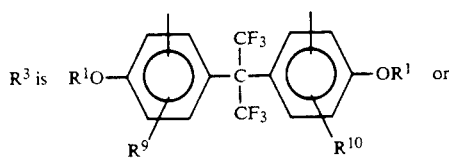

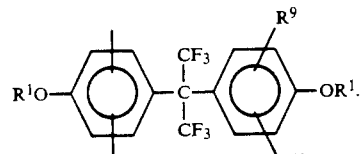

$R^4$ is —H or a monovalent organic group having 1 to 20 carbon atoms, preferably 1 to 10 carbon atoms, for example, methyl, phenyl, and o-hydroxyphenyl groups.

$R^5$, $R^6$, $R^7$, and $R^8$ are independently

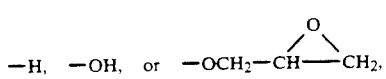

with the proviso that at least one or $R^5$, $R^6$, $R^7$, and $R^8$ is aldehyde compound in the presence of a catalyst, thereby obtaining a novolak type phenolic resin.

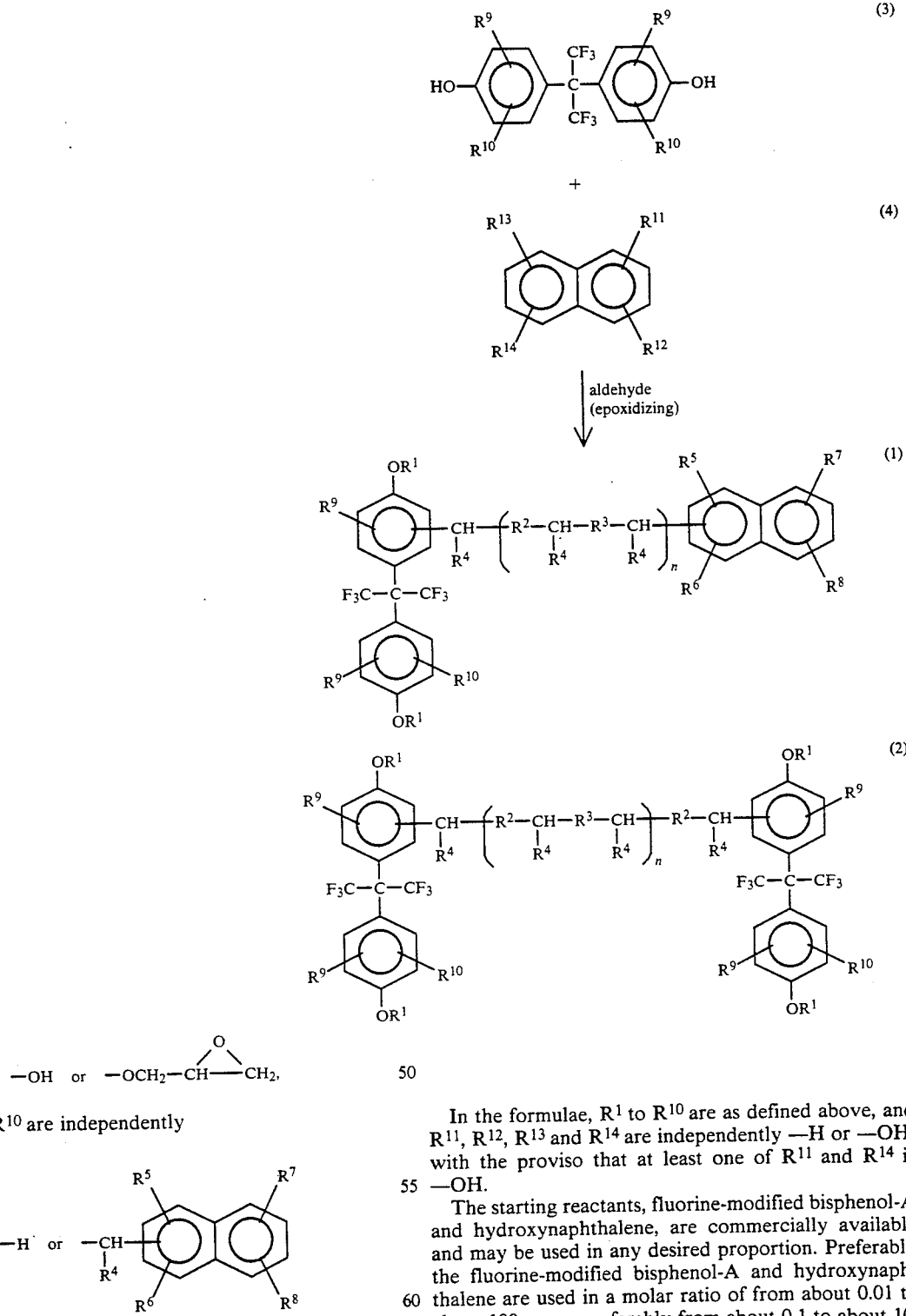

In the formulae, $R^1$ to $R^{10}$ are as defined above, and $R^{11}$, $R^{12}$, $R^{13}$ and $R^{14}$ are independently —H or —OH, with the proviso that at least one of $R^{11}$ and $R^{14}$ is —OH.

The starting reactants, fluorine-modified bisphenol-A and hydroxynaphthalene, are commercially available and may be used in any desired proportion. Preferably the fluorine-modified bisphenol-A and hydroxynaphthalene are used in a molar ratio of from about 0.01 to about 100, more preferably from about 0.1 to about 10.

The aldehyde compound may be formaldehyde and salicylaldehyde, for example. The amount of aldehyde compound used is not particularly limited although the molar ratio of aldehyde compound to phenolic compound preferably ranges from about 0.05 to about 1, more preferably from about 0.11 to about 0.7. A molar ratio of aldehyde compound to phenolic compound of —OH or —OCH$_2$—CH—CH$_2$, $R^9$ and $R^{10}$ are independently

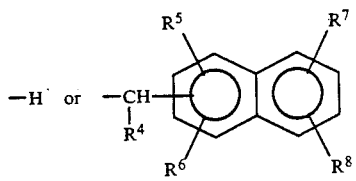

wherein $R^4$ to $R^8$ are as defined above.

Letter n is 0 or an integer of from 1 to 7.

The thermosetting resin of the present invention can be readily synthesized by using a fluorine-modified bisphenol-A of the following general formula (3) and a mono-, di-, tri- or tetrahydroxynaphthalene of the following general formula (4), interacting them with an less than 0.05 would sometimes result in a polymer having a smaller molecular weight whereas a molar ratio in excess of 1 would sometimes cause gelation.

The catalyst used herein may be selected from well-known alkali and acid catalysts, for example, such alkali catalysts as KOH and NaOH and such acid catalysts as hydrochloric acid, sulfuric acid, nitric acid, oxalic acid, paratoluenesulfonic acid, acetic acid, butyric acid, and propionic acid. The alkali or acid catalyst may be used in a catalytic amount, often in an amount of about 0.5 to 2% by weight based on the phenolic compound.

The conditions under which reaction to form novolak type polymers takes place are not particularly limited. Preferably, the fluorine-modified resin and aldehyde compound are combined in an alkaline aqueous solution to form a resol, which is made acidic. The hydroxynaphthalene is then added to the resol. Reaction is allowed to proceed at about 100° to 150° C. for about 4 to 8 hours, obtaining a novolak polymer.

Phenolic resins according to the present invention are produced in this way and if necessary, then epoxidized into epoxy resins which also fall within the scope of the present invention.

According to the second aspect of the present invention, the thermosetting resin composition is comprised of an epoxy resin, a phenolic resin, an inorganic filler, and a fluorine-modified resin of formula (1) or (2) or resin containing fluorine atoms and a naphthalene skeleton.

The resin containing fluorine atoms and a naphthalene skeleton of formula (1) or (2) is an epoxy or phenolic resin having water repellency attributable to the fluorine atoms and high rigidity and hydrophobic nature attributable to the naphthalene skeleton. Preferred examples of the resin of formula (1) or (2) used in the present composition are those having the following structural formulae.

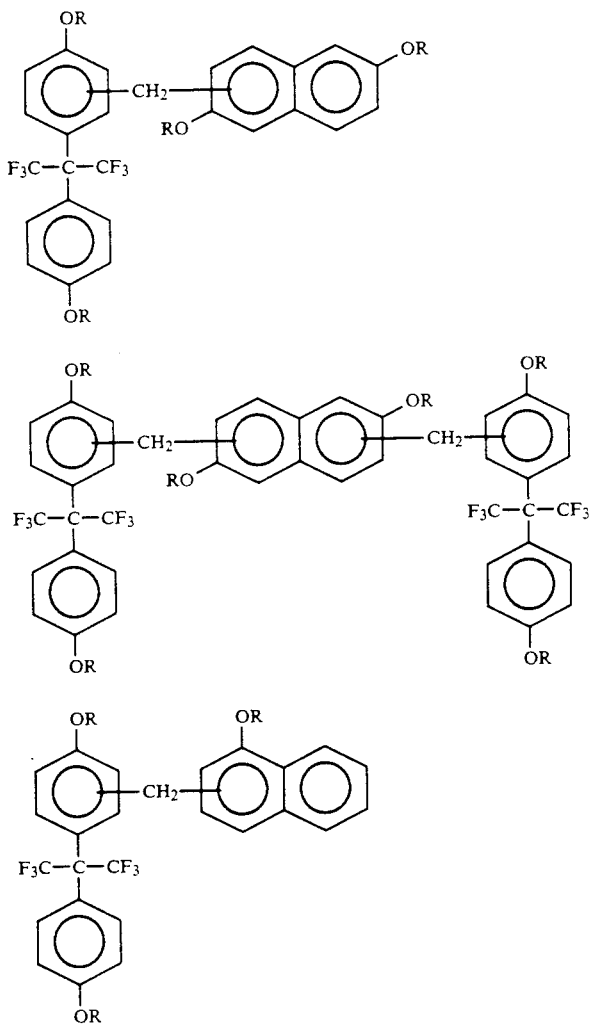

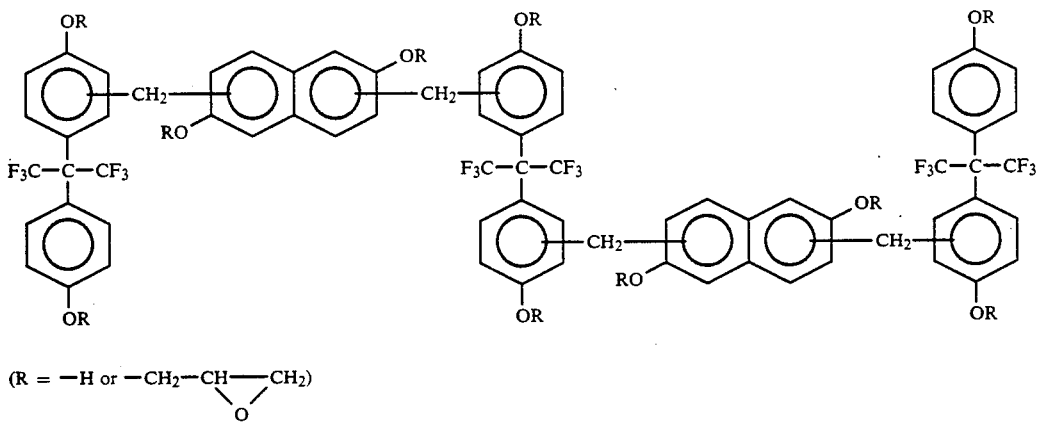

(R = —H or —CH$_2$—CH——CH$_2$)
                    \\  /
                     O

In the composition of the invention, an epoxy resin and a phenolic resin are blended in addition to the fluorine-modified resin and they may be ones commonly used in conventional semiconductor packaging compositions.

More particularly, the epoxy resin (other than the fluorine-modified resin of the invention) may be selected from those resins having at least two epoxy groups in a molecule, for example, bisphenol-A epoxy resins, novolak type epoxy resins, cycloaliphatic epoxy resins, glycidyl ester type epoxy resins, and preferably polyfunctional epoxy resins and naphthalene ring-containing epoxy resins, alone or in admixture of two or more. These epoxy resins should preferably have a softening point of 50° to 100° C. and an epoxy equivalent of 100 to 400. Use of brominated epoxy resins is also useful if flame retardancy is desired.

The phenolic resin serves as a curing agent for the epoxy resin. The phenolic resin (other than the fluorine-modified resin of the invention) may be selected from phenol novolak resins, cresol novolak resins, and those having two or more phenolic hydroxyl groups such as triphenolmethane. The phenolic resins should preferably have a softening point of 60° to 120° C. and a hydroxyl equivalent of 90 to 150.

The phenolic resin may be used in such amounts as to provide an equivalent ratio of epoxy group/hydroxyl group between 0.5 to 2 in the thermosetting resin composition. Often about 30 to 70 parts by weight of the phenolic resin is used per 100 parts by weight of the epoxy resin. The amount of fluorine-modified phenolic resin plus conventional phenolic resin blended should preferably be adjusted to such a range. Less than 30 parts of the phenolic resins would sometimes be too small to provide strength whereas more than 70 parts would sometimes result in a lowering of moisture resistance.

The fluorine-modified resin of formula (1) or (2) is preferably used in an amount of about 20 to 100%, more preferably about 50 to 80% by weight based on the total weight (100%) of the epoxy resins and phenolic resins combined. The fluorine-modified epoxy resin among the fluorine-modified resins of formula (1) or (2) is preferably used in an amount of about 0 to 100%, more preferably about 50 to 80% by weight based on the total weight of the epoxy resin(s). The fluorine-modified phenolic resin among the fluorine-modified resins of formula (1) or (2) is preferably used in an amount of about 0 to 100%, more preferably about 50 to 80% by weight based on the total weight of the phenolic resin(s).

The inorganic filler is blended in the present composition for the purpose of reducing the coefficient of thermal expansion of cured products, thereby alleviating the stresses on semiconductor elements. For example, fused silica and crystalline silica in pulverized or spherical form are often used. Alumina, silicon nitride and aluminum nitride are also useful. Mixtures of pulverized and spherical forms are preferred as well as principally spherical form fillers.

The inorganic fillers should preferably have a mean particle size of about 5 to 20 μm and be blended in an amount of about 200 to 1600 parts, more preferably about 300 to 1200 parts by weight per 100 parts by weight of the epoxy resin. Less than 200 parts of the filler would sometimes result in cured products having a higher coefficient of thermal expansion to apply substantial stresses to semiconductor elements, degrading the element properties. Compositions containing more than 1600 parts of the filler would be too viscous during molding. Desirably, the inorganic fillers are previously surface treated with silane coupling agents.

In addition to the above-mentioned components, the thermosetting resin composition of the invention may contain silicone series plasticizers or thermoplastic resins for stress reducing purposes. Examples include silicone rubber powder, silicone gel, organic resin-silicone block polymers MBS resins, and SEBS. It is also useful to surface treat the inorganic filler with a two part type silicone rubber or silicone gel before addition.

These stress reducing agents are desirably used in an amount of about 0.5 to 10% by weight, especially about 1 to 5% by weight based on the entire thermosetting resin composition. Less than 0.5% of the stress reducing agent would be less effective for imparting thermal shock resistance whereas more than 10% would sometimes result in a lowering of mechanical strength.

If desired, the thermosetting resin composition of the present invention may contain curing promoters such as imidazole or its derivatives, phosphine derivatives, and cycloamidine derivatives; mold release agents such as carnauba wax, higher fatty acids, and waxes; and silane coupling agents, antimony oxide, phosphorus compounds, bromine and chlorine-containing compounds, all in their commonly used amounts.

The thermosetting resin composition of the invention may be prepared by uniformly melting and milling the above-mentioned components in a roll mill, kneader or continuous extruder preheated at about 80° to 100° C. The order of addition of the components is not critical.

The thermosetting resin and thermosetting resin composition according to the present invention are useful for semiconductor packages including DIP, flat pack, PLCC, and SO types. Any conventional molding technique may used, for example, transfer molding, injection molding and casting. The composition is often molded at a temperature of 150° to 180° C. and post cured at 150° to 180° C. for about 2 to 16 hours.

EXAMPLE

Examples of the present invention are given below by way of illustration and not by way of limitation. All parts and percents are by weight unless otherwise stated. G represents

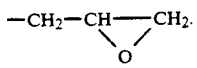

EXAMPLE 1

A 1-liter four-necked flask equipped with a condenser, thermometer and stirrer was charged with 168 grams of 2,2-bis(4-hydroxy-phenylhexafluoropropane, 48.7 grams of 37% formaldehyde aqueous solution and 100 grams of water in a nitrogen atmosphere. With stirring, 1.0 gram of potassium hydroxide was added to the flask and reaction was carried out for 6 hours under reflux. After cooling, 3.3 grams of oxalic acid, 140 grams of toluene, and 80 grams of 2,6-dihydroxynaphthalene were added to the flask. The mixture was heated to remove water for 2 hours under toluene reflux. After a further 2 hours of reaction, the toluene was removed under vacuum and reaction was carried out at 150° C. for one hour. Thereafter, the reaction mixture was cooled, diluted with methyl isobutyl ketone, and washed with water. Upon removal of the solvent by distillation, there was obtained 218 grams (yield 85.9%) of Compound A having a OH equivalent of 131 (theory 127). Compound A was identified by NMR and IR analysis.

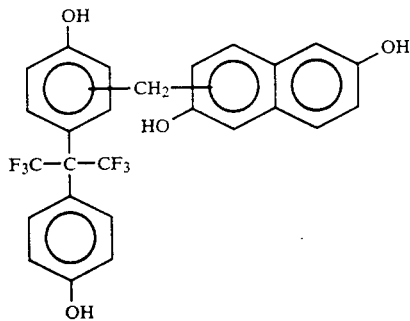
(A)

Next, a 1-liter four-necked flask equipped with a condenser, thermometer and stirrer was charged with 197 grams of Compound A, 800 grams of epichlorohydrin, and 1.5 grams of cetyltrimethylammonium. The mixture was stirred for 3 hours under reflux. Then 120 grams of 50% sodium hydroxide aqueous solution was added dropwise to the flask in a vacuum (80°-90° C./100-130 mmHg). After the completion of dropwise addition, the mixture was aged for 3 hours, filtered, and removed of the solvent. Further, hydrolyzable chlorine was removed with 10% sodium hydroxide aqueous solution. Water washing left 250 grams (yield 91%) of Compound B having an epoxy equivalent of 189 (theory 183).

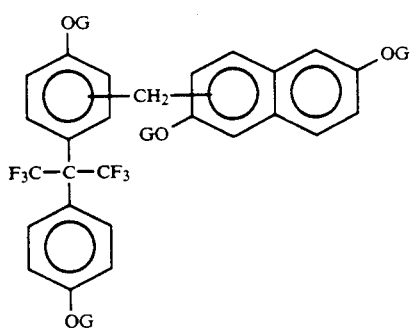
(B)

EXAMPLE 2

A 1-liter four-necked flask equipped with a condenser, thermometer and stirrer was charged with 168 grams of 2,2-bis(4-hydroxyphenyl)hexafluoropropane, 48.7 grams of 37% formaldehyde aqueous solution and 100 grams of water in a nitrogen atmosphere. With stirring, 1.0 gram of potassium hydroxide was added to the flask and reaction was carried out for 6 hours under reflux. After cooling, 3.3 grams of oxalic acid, 140 grams of toluene, and 72 grams of α-naphthol were added to the flask. The mixture was heated to remove water for 2 hours under toluene reflux. After a further 2 hours of reaction, the toluene was removed under vacuum and reaction was carried out at 150° C. for one hour. Thereafter, the reaction mixture was cooled, diluted with methyl isobutyl ketone, and washed with water. Upon removal of the solvent by distillation, there was obtained 214 grams (yield 87.0%) of Compound C having a OH equivalent of 169 (theory 164). Compound C was identified by NMR and IR analysis.

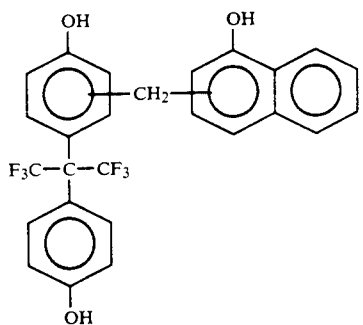
(C)

Next, a 1-liter four-necked flask equipped with a condenser, thermometer and stirrer was charged with 177 grams of Compound C, 800 grams of epichlorohydrin, and 1.5 grams of cetyltrimethylammonium. The mixture was stirred for 3 hours under reflux. Then 120 grams of 50% sodium hydroxide aqueous solution was added dropwise to the flask in a vacuum (80°-90° C./100-130 mmHg). After the completion of dropwise addition, the mixture was aged for 3 hours, filtered, and removed of the solvent. Further, hydrolyzable chlorine was removed with 10% sodium hydroxide aqueous solution. Water washing left 236 grams (yield 90.5%) of Compound D having an epoxy equivalent of 228 (theory 220).

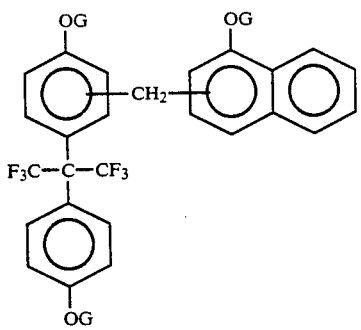

(D)

Figure 2:
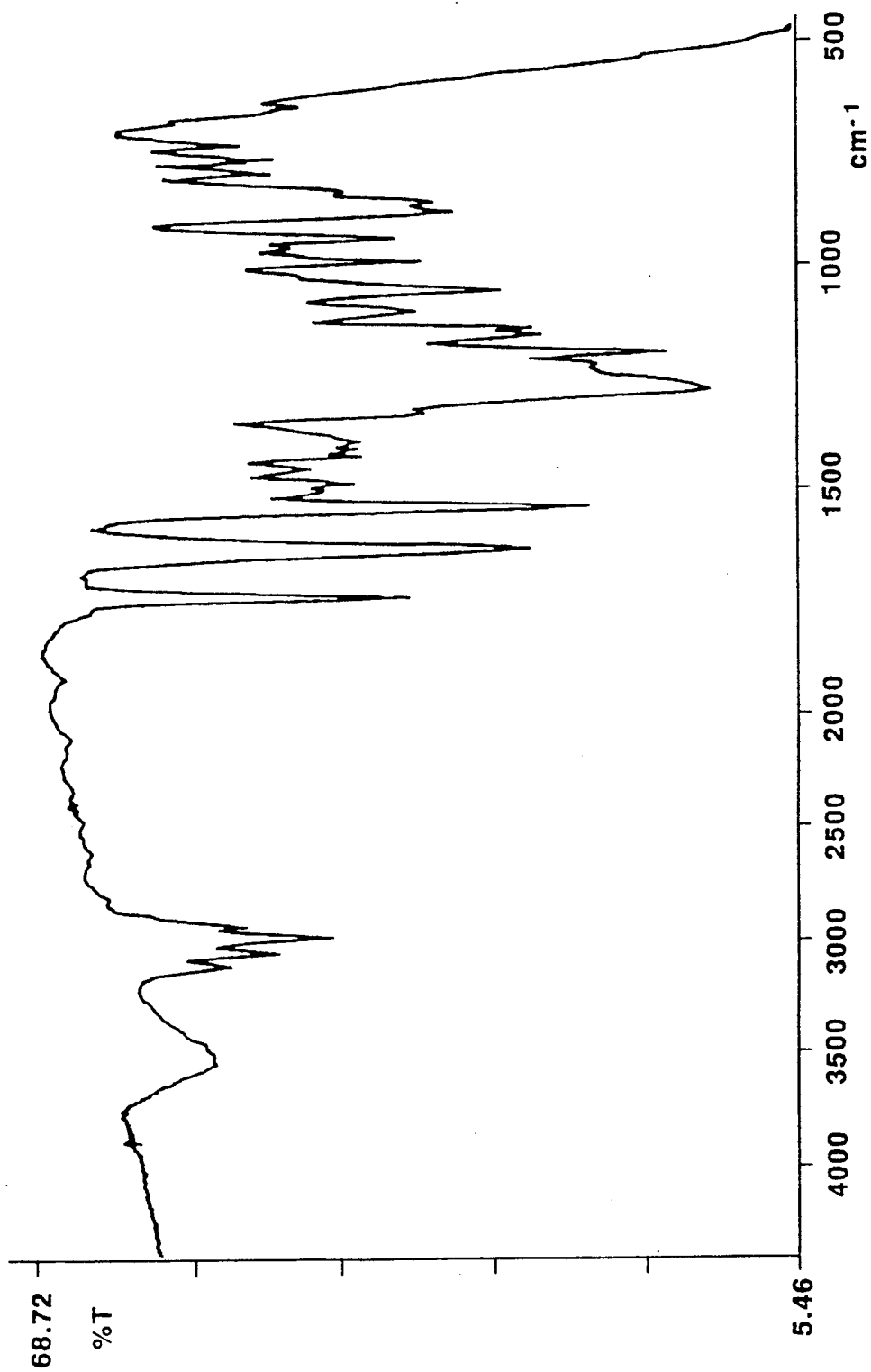
FIG. 2 is an IR chart of an epoxy resin according to the present invention designated Compound B in Example 1.
Figure 3:
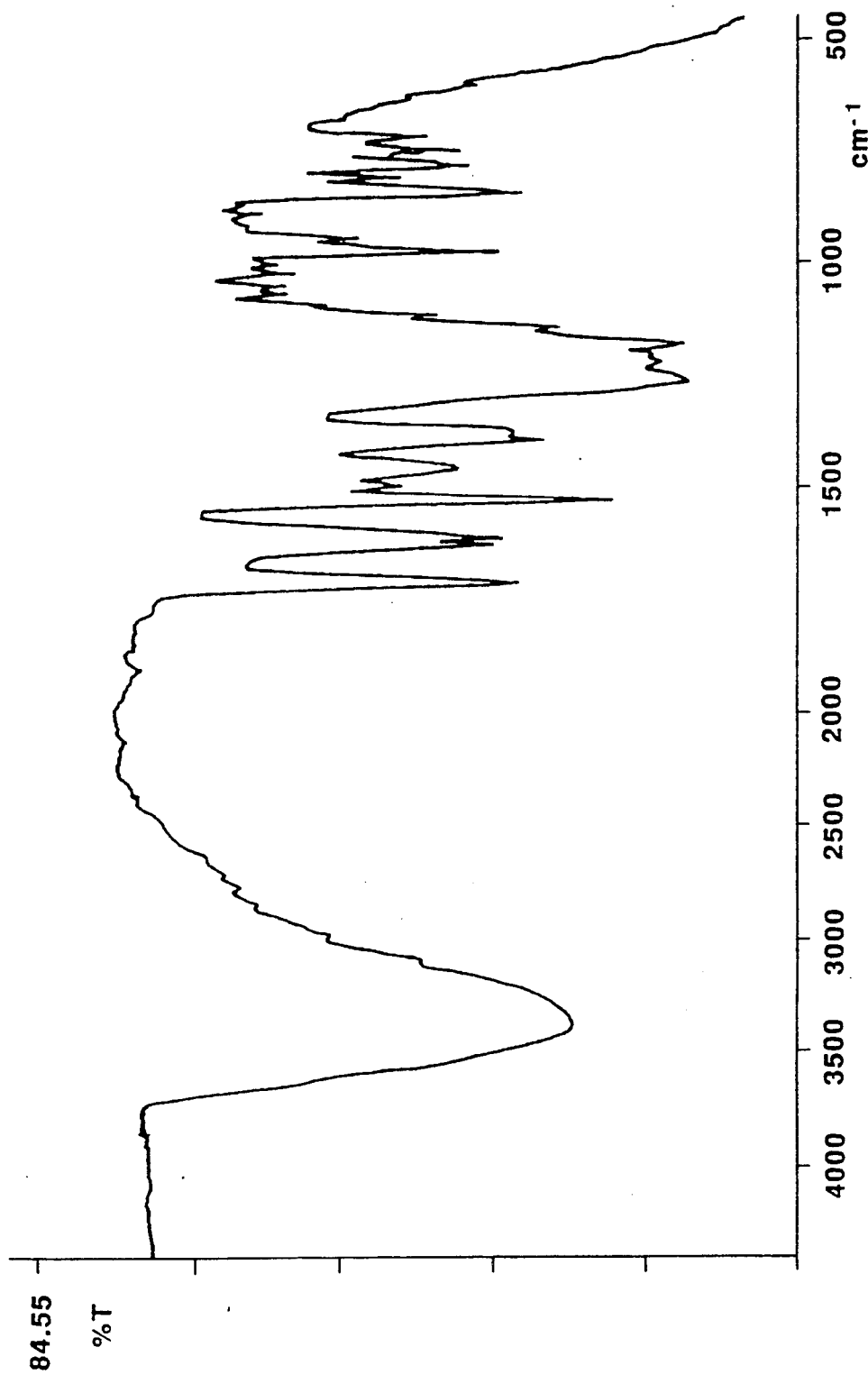
FIG. 3 is an IR chart of a phenolic resin according to the present invention designated Compound C in Example 2.
Figure 4:
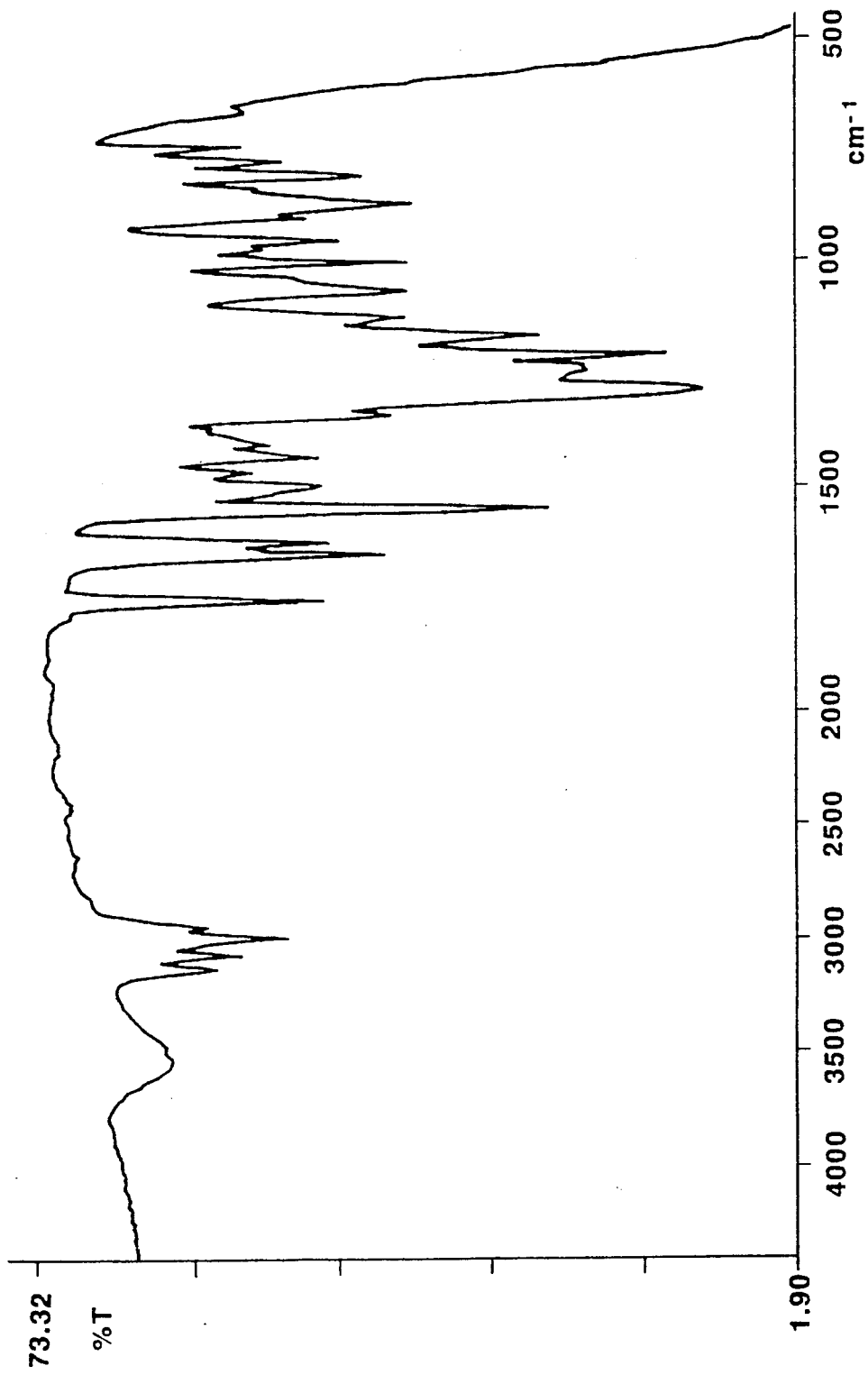
FIG. 4 is an IR chart of an epoxy resin according to the present invention designated Compound D in Example 2.

IR spectra of Compounds A to D are shown in FIGS. 1 to 4. NMR peaks of Compounds A to D have the following ascription.

$^1$H NMR solvent: $(CD_3)_2CO$
ppm ($\delta$)

(A) 4.2~4.4: —C$\underline{H}_2$—
6.5~8.0: $+C_6\underline{H}_3+$, $+C_6\underline{H}_4+$, $+C_{10}\underline{H}_5+$ (B) 2.3~2.7: —C$\underline{H}$——CH$_2$ (epoxide)

2.9~3.3: —C$\underline{H}$——C$\underline{H}_2$ (epoxide)

3.5~4.1: —C$\underline{H}_2$—C$\underline{H}$——CH$_2$ (epoxide)
4.2~4.4: —C$\underline{H}_2$—
6.5~8.0: $+C_6\underline{H}_3+$, $+C_6\underline{H}_4+$, $+C_{10}\underline{H}_5+$ (C) 4.2~4.4: —C$\underline{H}_2$—
6.5~8.0: $+C_6\underline{H}_3+$, $+C_6\underline{H}_4+$, $+C_{10}\underline{H}_5+$ (D) 2.3~2.7: —C$\underline{H}$——CH$_2$ (epoxide)

2.9~3.3: —C$\underline{H}$——C$\underline{H}_2$ (epoxide)

3.5~4.1: —C$\underline{H}_2$—CH——CH$_2$ (epoxide)
4.2~4.4: —C$\underline{H}_2$—
6.5~8.0: $+C_6\underline{H}_3+$, $+C_6\underline{H}_4+$, $+C_{10}\underline{H}_5+$

EXAMPLE 3

A 1-liter four-necked flask equipped with a condenser, thermometer and stirrer was charged with 168 grams of 2,2-bis(4-hydroxyphenyl)hexafluoropropane, 48.7 grams of 37% formaldehyde aqueous solution and 100 grams of water in a nitrogen atmosphere. With stirring, 1.0 gram of potassium hydroxide was added to the flask and reaction was carried out for 6 hours under reflux. Separately, but by the same procedure, a mixture of 84 grams of 2,2-bis(hydroxyphenyl)hexafluoropropane, 48.7 grams of 37% formaldehyde aqueous solution, 100 grams of water, and 1.0 gram of potassium hydroxide was subject to reaction. After cooling, these two reaction mixtures were combined in a 2-liter flask, to which 6.6 grams of oxalic acid, 300 grams of toluene, and 160 grams of 2,6-dihydroxynaphthalene were added. The mixture was heated to remove water for 2 hours under toluene reflux. After a further 2 hours of reaction, the toluene was removed under vacuum and reaction was carried out at 150° C. for one hour. Thereafter, the reaction mixture was cooled, diluted with methyl isobutyl ketone, and washed with water. Upon removal of the solvent by distillation, there was obtained 395 grams (yield 84.5%) of Compound E having a OH equivalent of 144 (theory 138). Compound E was identified by NMR and IR analysis.

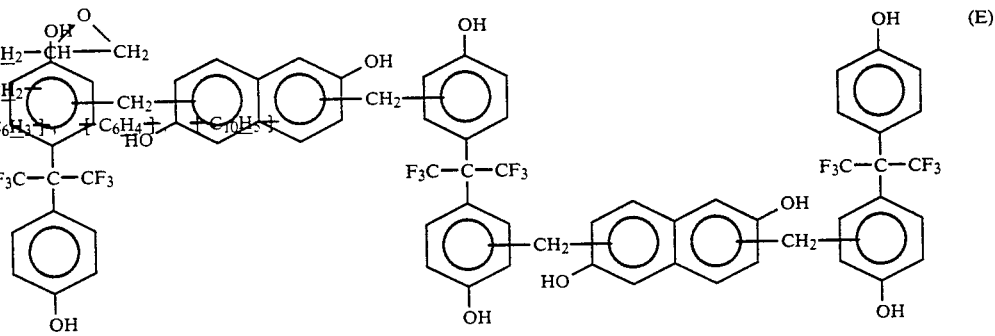

(E)

Next, a 1-liter four-necked flask equipped with a condenser, thermometer and stirrer was charged with 216 grams of Compound E, 800 grams of epichlorohydrin, and 1.5 grams of cetyltrimethylammonium. The mixture was stirred for 3 hours under reflux. Then 120 grams of 50% sodium hydroxide aqueous solution was added dropwise to the flask in a vacuum (80°-90° C./100-130 mmHg). After the completion of dropwise addition, the mixture was aged for 3 hours, filtered, and removed of the solvent. Further, hydrolyzable chlorine was removed with 10% sodium hydroxide aqueous solution. Water washing left 265 grams (yield 88.5%) of Compound F having an epoxy equivalent of 205 (theory 194).

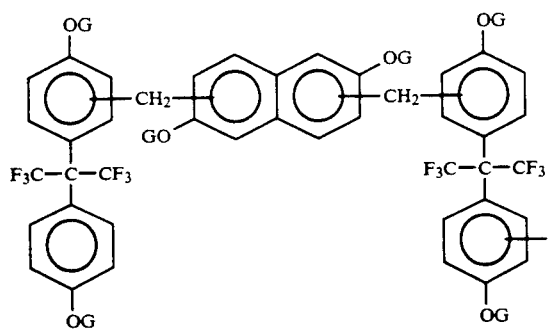
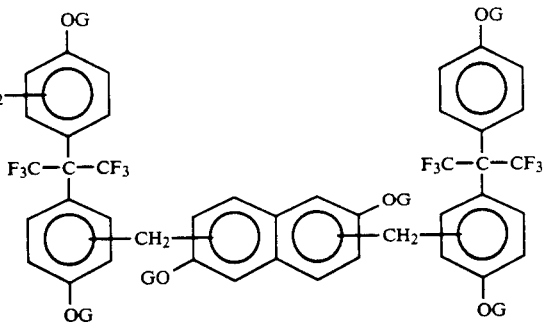

(F)

Examples 4–6 & Comparative Example 1

Three thermosetting resin compositions were prepared by blending fluorine-modified epoxy resins B, D, F and fluorine-modified phenolic resins A, C, E synthesized in Examples 1 to 3, curing catalyst, ground quartz, and flame retardant in the amounts shown in Table 1 and uniformly melting and milling the blend in a hot two-roll mill.

For comparison purpose, a thermosetting resin composition was similarly prepared using the phenol novolak resin (Compound G) and epoxidized ortho-cresol novolak resin (Compound H).

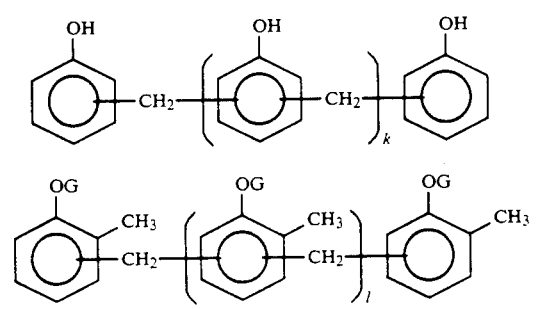

These thermosetting resin compositions were examined by the following tests (i) to (iv).

(i) Spiral flow

The spiral flow was measured at 175° C. and 70 kg/cm² using a mold according to the EMMI standard.

(ii) Mechanical strength (flexural strength and flexural modulus)

A tensile test bar of 10×4×100 mm according to JIS K-6911 was molded from the composition at 180° C. and 70 kg/cm² for 2 minutes and post cured at 180° C. for 4 hours. The bar 7as measured for flexural strength and flexural modulus at room temperature.

(iii) Coefficient of expansion and glass transition temperature

A test piece of 5×5×15 mm was molded at 180° C. and 70 kg/cm² for 2 minutes and post cured at 180° C. for 4 hours. The test piece was measured for coefficient of expansion and glass transition temperature (Tg) using a dilatometer while it was heated at a rate of 5° C./min.

(iv) Water pickup

A disk having a diameter of 50 mm and a thickness of 3 mm was molded at 180° C. and 70 kg/cm² for 2 minutes and post cured at 180° C. for 4 hours. It was allowed to stand for 24 hours in a 121° C./100% RH atmosphere and then measured for water pickup.

TABLE 1

|  | Example | | | Comparative Example |
|---|---|---|---|---|
|  | 4 | 5 | 6 | 1 |
| Composition (pbw) | | | | |
| Phenolic resin A | 38.7 | | | |
| Phenolic resin C | | 40.7 | | |
| Phenolic resin E | | | 39.2 | |
| Phenolic resin G | | | | 33.5 |
| Epoxy resin B | 52.8 | | | |
| Epoxy resin D | | 50.8 | | |
| Epoxy resin F | | | 52.3 | |
| Epoxy resin H | | | | 58.0 |
| Flame retardant | 8.5 | 8.5 | 8.5 | 8.5 |
| Triphenylphosphine | 1.0 | 1.0 | 1.0 | 1.0 |
| Silane coupling agent* | 1.0 | 1.0 | 1.0 | 1.0 |
| Ground quartz | 500.0 | 500.0 | 500.0 | 500.0 |
| Co-flame retardant (SbO₃) | 8.0 | 8.0 | 8.0 | 8.0 |
| Mold release agent** | 0.8 | 0.8 | 0.8 | 0.8 |
| Carbon black | 1.0 | 1.0 | 1.0 | 1.0 |
| Properties | | | | |
| Spiral flow (cm) | 62.0 | 65.0 | 58.0 | 63.0 |
| Flexural strength (kg/mm²) | 12.9 | 13.4 | 13.7 | 12.8 |
| Flexural modulus (kg/mm²) | 1970 | 1880 | 2040 | 1850 |
| Tg (°C.) | 192 | 173 | 188 | 162 |
| Coefficient of linear expansion (10⁻⁵/°C.) α1 | 0.91 | 1.02 | 1.11 | 1.58 |
| α2 | 2.98 | 3.85 | 3.96 | 6.93 |
| Water pickup (%) | 0.55 | 0.49 | 0.52 | 0.72 |

*Silane coupling agent = γ-glycidoxypropyltrimethoxysilane
**Mold release agent = carnauba wax It is evident from Table 1 that the thermosetting resin compositions using the thermosetting resins within the scope of the present invention present cured products having high flexural strength and flexural modulus, especially high Tg, a low coefficient of linear expansion and low water pickup as compared with the composition using conventional orthocresol novolak epoxy resin and phenol novolak resin.

EXAMPLES 7-20 & COMPARATIVE EXAMPLES 2-6

Nineteen thermosetting resin compositions were prepared by blending the components shown in Tables 2–4, 1.5 parts of γ-glycidoxypropyltrimethoxysilane, 1.5 parts of wax E, 1.0 part of carbon black, 0.8 parts of triphenylphosphine and uniformly melting and milling the blend in a hot two-roll mill.

These thermosetting resin compositions were examined by the following tests (i) to (v).

(i) Spiral flow
The spiral flow was measured at 175° C. and 70 kg/cm$^2$ using a mold according to the EMMI standard.

(ii) Mechanical strength (flexural strength and flexural modulus)

A tensile test bar of 10×4×100 mm according to JIS K-6911 was molded from the composition at 180° C. and 70 kg/cm$^2$ for 2 minutes and post cured at 180° C. for 4 hours. The base was measured for flexural strength and flexural modulus at 215° C.

(iii) Coefficient of expansion and Tg
A test piece having a diameter of 4 mm and a height of 15 mm was measured for coefficient of expansion and Tg using a dilatometer while it was heated at a rate of 5° C./min.

(iv) Water pickup
A disk having a diameter of 30 mm and a thickness of 3 mm was molded at 175° C. for 2 minutes and post cured at 180° C. for 4 hours. It was allowed to stand for 24 hours in a 85° C./85% RH atmosphere and then measured for water pickup.

(v) Adhesion
A cylindrical button having a diameter of 15 mm and a height of 5 mm was molded on a 42-alloy plate of 17×17×1 mm thick at 175° C. for 2 minutes and post cured at 180° C. for 4 hours. Using a push-pull gage, the force required to separate the molded button from the 42-alloy plate was measured (average of 8 samples).

TABLE 2

| | Example | | | | | | | | |
|---|---|---|---|---|---|---|---|---|---|
| | 7 | 8 | 9 | 10 | 11 | 2 | 13 | 14 | 15 |
| Composition (pbw) | | | | | | | | | |
| Epoxy resin (Ib) | 52.8 | — | — | 56.8 | — | — | — | — | — |
| Epoxy resin (IIb) | — | 51.1 | — | — | 60.5 | — | — | — | — |
| Epoxy resin (IIIb) | — | — | 52.9 | — | — | 58.5 | — | — | — |
| Epoxy resin (IVb) | — | — | — | — | — | — | 54.0 | 48.3 | 52.3 |
| EOCN 1020 (65) 1) | — | — | — | — | — | — | 37.5 | — | — |
| Phenolic resin (Ia) | 38.7 | — | — | — | — | — | — | 43.2 | — |
| Phenolic resin (IIa) | — | 40.4 | — | — | — | — | — | — | — |
| Phenolic resin (IIIa) | — | — | 38.6 | — | — | — | — | — | 39.2 |
| Phenolic resin (IVa) | — | — | — | — | — | — | — | — | — |
| TD-2093 2) | — | — | — | 34.7 | 31.0 | 33.0 | — | — | — |
| Brominated epoxy resin 3) | 8.5 | 8.5 | 8.5 | 8.5 | 8.5 | 8.5 | 8.5 | 8.5 | 8.5 |
| Silica | 500 | 500 | 500 | 500 | 500 | 500 | 500 | 500 | 500 |
| Properties | | | | | | | | | |
| Spiral flow (cm) | 22 | 23 | 20 | 24 | 25 | 22 | 21 | 22 | 21 |
| Flexural strength (kg/mm$^2$) | 12.5 | 12.7 | 13.1 | 12.3 | 12.4 | 12.8 | 13.1 | 12.4 | 13.4 |
| Flexural modulus (kg/mm$^2$) | 1820 | 1860 | 1810 | 1920 | 1880 | 1790 | 1810 | 1830 | 1830 |
| Tg (°C.) | 181 | 182 | 179 | 174 | 182 | 185 | 179 | 178 | 180 |
| Coefficient of linear expansion (10$^{-5}$/°C., α 1) | 0.91 | 0.95 | 1.0 | 1.1 | 1.0 | 0.9 | 0.9 | 1.0 | 1.1 |
| Water pickup (%) | 0.55 | 0.49 | 0.50 | 0.52 | 0.51 | 0.49 | 0.48 | 0.50 | 0.51 |
| Adhesion (kg) | 22 | 27 | 31 | 30 | 23 | 31 | 32 | 33 | 31 |

TABLE 3

| | Example | | | | |
|---|---|---|---|---|---|
| | 16 | 17 | 18 | 19 | 20 |
| Composition (pbw) | | | | | |
| Epoxy resin (Ib) | 28.7 | 29.6 | — | — | 29.2 |
| Epoxy resin (IIb) | — | — | — | 29.8 | — |
| Epoxy resin (IIIb) | — | — | — | 29.8 | — |
| Epoxy resin (IVb) | — | 29.6 | 51.1 | — | 29.2 |
| EOCN 1020 (65) 1) | 28.7 | — | 20.0 | — | — |
| Phenolic resin (Ia) | — | — | — | — | — |
| Phenolic resin (IIa) | — | — | — | — | — |
| Phenolic resin (IIIa) | — | — | 20.2 | — | — |
| Phenolic resin (IVa) | — | — | — | — | — |
| TD-2093 2) | 34.1 | 32.3 | — | 32.0 | 33.0 |
| Brominated epoxy resin 3) | 8.5 | 8.5 | 8.5 | 8.5 | 8.5 |
| Silica | 500 | 500 | 500 | 500 | 500 |
| Properties | | | | | |
| Spiral flow (cm) | 22 | 24 | 20 | 20 | 21 |
| Flexural strength (kg/mm$^2$) | 12.5 | 12.8 | 12.5 | 12.4 | 12.5 |
| Flexural modulus (kg/mm$^2$) | 1810 | 1850 | 1800 | 1820 | 1840 |
| Tg (°C.) | 181 | 181 | 179 | 176 | 175 |
| Coefficient of linear expansion (10$^{-5}$/°C., α 1) | 1.1 | 1.2 | 0.9 | 1.0 | 1.1 |
| Water pickup (%) | 0.49 | 0.48 | 0.50 | 0.51 | 0.51 |

TABLE 3-continued

| | Example | | | | |
|---|---|---|---|---|---|
| | 16 | 17 | 18 | 19 | 20 |
| Adhesion (kg) | 28 | 27 | 30 | 31 | 32 |

TABLE 4

| | Comparative Example | | | | |
|---|---|---|---|---|---|
| | 2 | 3 | 4 | 5 | 6 |
| Composition (pbw) | | | | | |
| Epoxy resin (Ib) | — | — | — | — | — |
| Epoxy resin (IIb) | — | — | — | — | — |
| Epoxy resin (IIIb) | — | 29.5 | — | 50.1 | 27.3 |
| Epoxy resin (IVb) | — | — | — | — | 27.3 |
| EOCN 1020 (65) 1) | 58.8 | 29.5 | 47.7 | — | — |
| Phenolic resin (Ia) | — | — | — | — | — |
| Phenolic resin (IIa) | — | — | — | — | — |
| Phenolic resin (IIIa) | — | — | 43.8 | 41.4 | 18.4 |
| Phenolic resin (IVa) | — | — | — | — | 18.4 |
| TD-2093 2) | 33.5 | 32.5 | — | — | — |
| Brominated epoxy resin 3) | 8.5 | 8.5 | 8.5 | 8.5 | 8.5 |
| Silica | 500 | 500 | 500 | 500 | 500 |
| Properties | | | | | |
| Spiral flow (cm) | 21 | 22 | 21 | 22 | 21 |
| Flexural strength (kg/mm²) | 12.7 | 12.9 | 13.1 | 12.8 | 13.1 |
| Flexural modulus (kg/mm²) | 1820 | 1840 | 1810 | 1830 | 1820 |
| Tg (°C.) | 162 | 165 | 164 | 163 | 162 |
| Coefficient of linear expansion ($10^{-5}$/°C., $\alpha$ 1) | 1.5 | 1.4 | 1.3 | 1.3 | 1.4 |
| Water pickup (%) | 0.72 | 0.75 | 0.71 | 0.69 | 0.70 |
| Adhesion (kg) | 10 | 11 | 12 | 13 | 11 |

The epoxy resins and phenolic resins used herein are shown below.

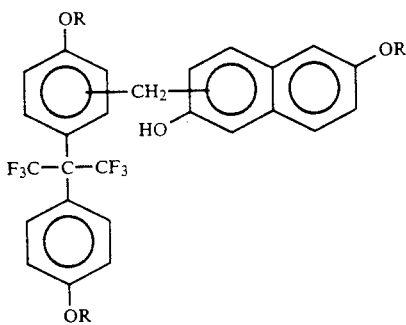

(Ia) R=H, OH equiv. 131, SP 95° C.
(Ib) R=G, Epoxy equiv. 189, SP 83° C.

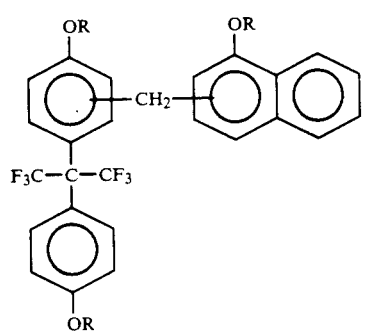

(IIa) R=H, OH equip. 169, SP 85° C.
(IIb) R=G, Epoxy equiv. 228, SP 73° C.

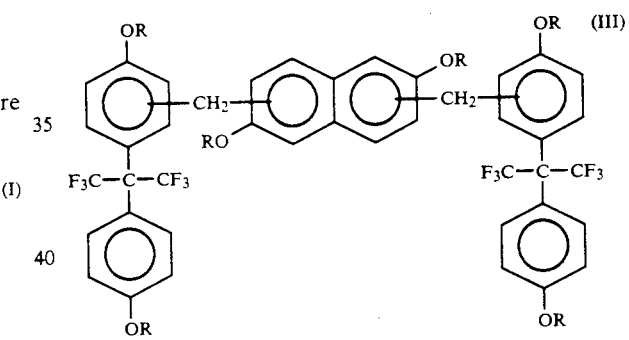

(IIIa) R=H, OH equip. 144, SP 105° C.
(IIIb) R=G, Epoxy equiv. 206, SP 97° C.

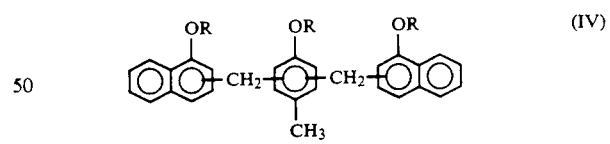

(IVa) R=H, OH equip. 171, SP 95° C.
(IVb) R=G, Epoxy equiv. 224, SP 85° C.

Note
1) ortho-cresol novolak type epoxy resin (softening point 65° C., epoxy equiv. 200) tradename EOCN 1020(65) manufactured by Nippon Kayaku K. K.
2) phenol novolak type epoxy resin (softening point 100° C., OH equiv. 110) tradename TD2093 manufactured by Dai-Nihon Ink K.K.
3) brominated phenol novolak type epoxy resin (softening point 85° C., epoxy equiv. 280) tradename BREN-S manufactured by Nippon Kayaku K.K.

It is evident from Tables 2 to 4 that the thermosetting resin compositions comprising epoxy resin, phenolic resin, inorganic filler and a phenolic or epoxy resin having fluorine atoms and a naphthalene skeleton within the scope of the present invention present cured products retaining mechanical strength such as high flexural strength and flexural modulus and exhibiting high Tg, a low coefficient of linear expansion and low water pickup and firm adhesion as compared with the composition free of a phenolic or epoxy resin having fluorine atoms and a naphthalene skeleton.

We claim:

1. A thermosetting resin selected from the group consisting of:

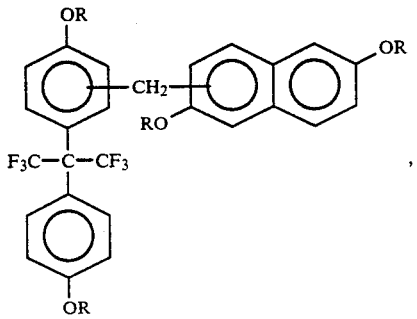

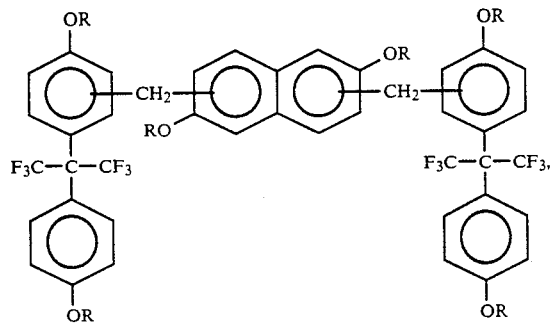

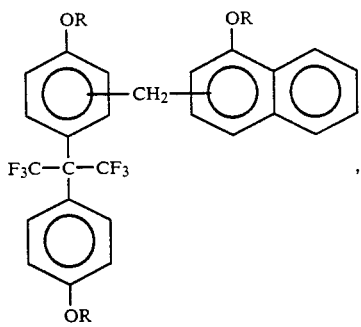

and

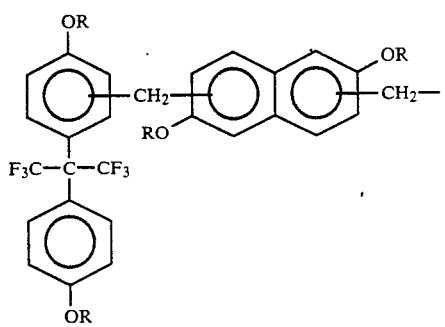

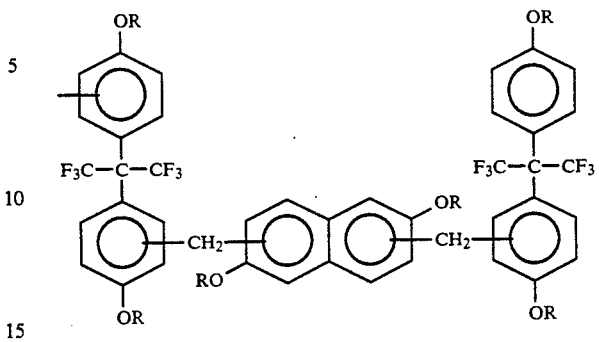

wherein R is

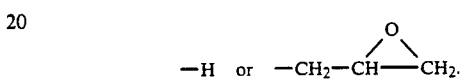

2. The resin according to claim 1, wherein R is —H.

3. The resin according to claim 1, wherein R is

4. A thermosetting resin composition comprising an epoxy resin and a phenolic resin, wherein at least one of said epoxy and phenolic resins is selected from the group consisting of:

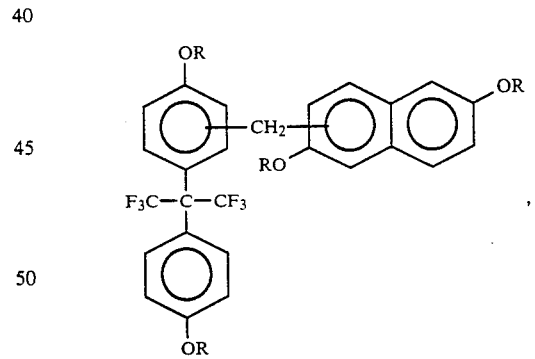

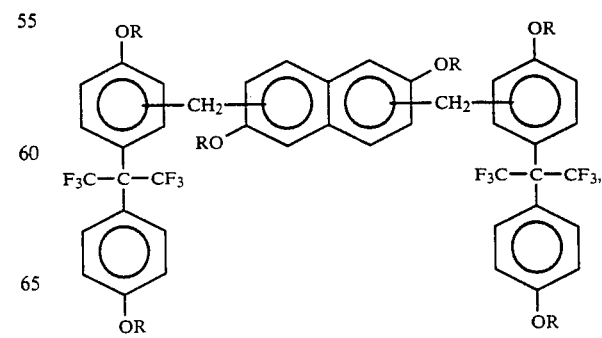

-continued

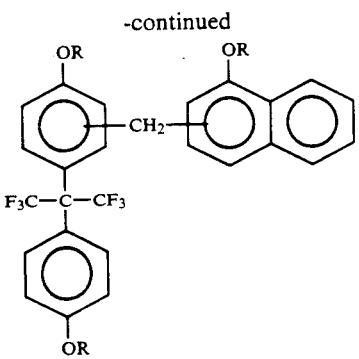

and

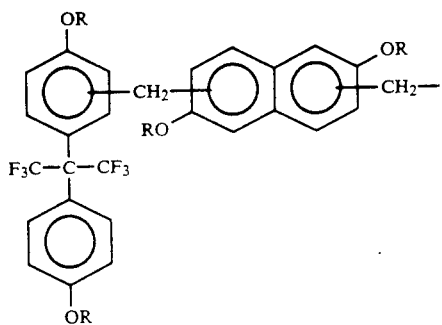

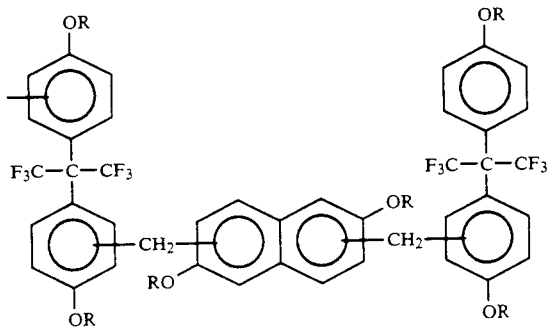

wherein R is

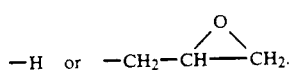

5. A thermosetting resin composition comprising an epoxy resin, a phenolic resin and a third resin selected from the group consisting of:

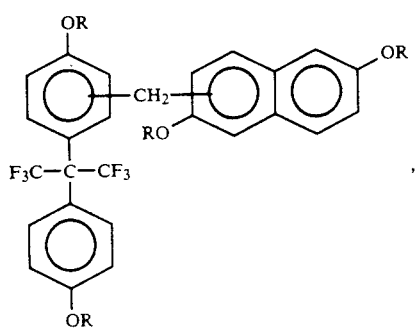

-continued

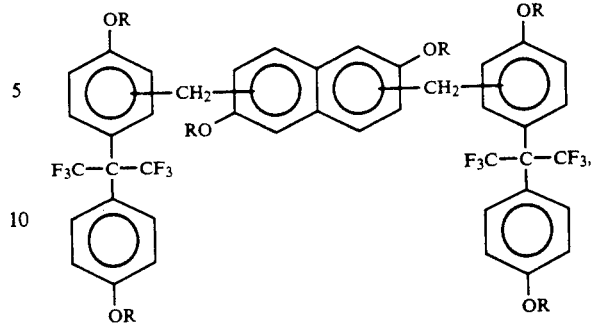

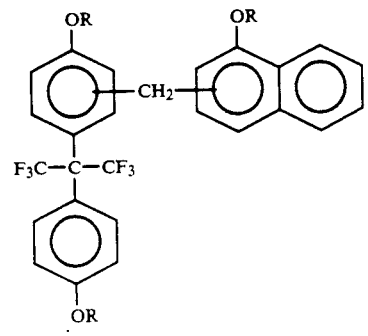

and

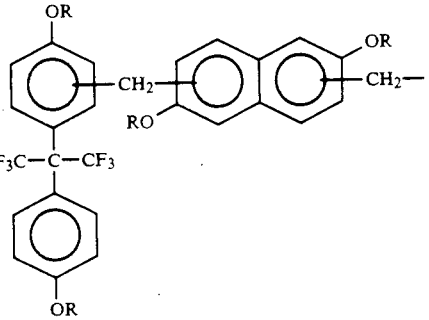

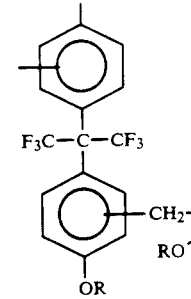

wherein R is

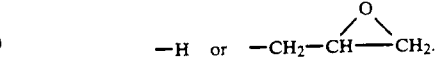

6. The composition according to claim 5, which further comprises an inorganic filler.

7. The composition according to claim 5, wherein said epoxy resin, said phenolic resin, and said third resin are present in such an amount that the equivalent ratio of epoxy group to hydroxyl group is between 0.5 to 2.

8. The composition according to claim 5, wherein said third resin is present in an amount of 20 to 80%, by weight, based on the total weight of all epoxy resins and phenolic resins.

9. The composition according to claim 5, wherein R is

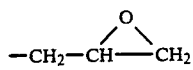

and said third resin is present in an amount of about 50 to 80%, by weight, based on the total weight of all epoxy resins present in said composition.

10. The composition according to claim 5, wherein R is —H and said third resin is present in an amount of about 50 to 80%, by weight, based on the total weight of all phenolic resins present in said composition.

11. The composition according to claim 9, which further comprises a fourth resin selected from the group consisting of

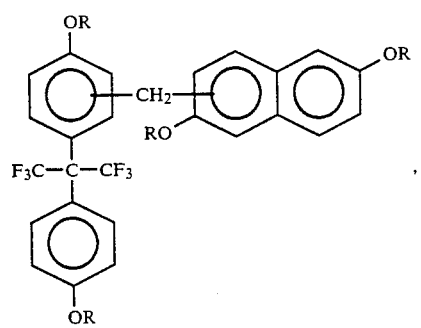

,

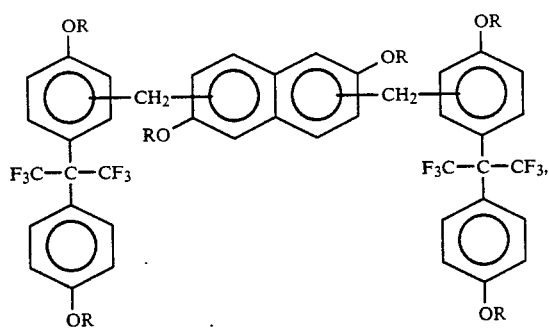

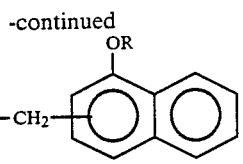

-continued

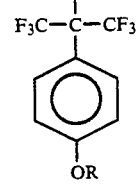

and

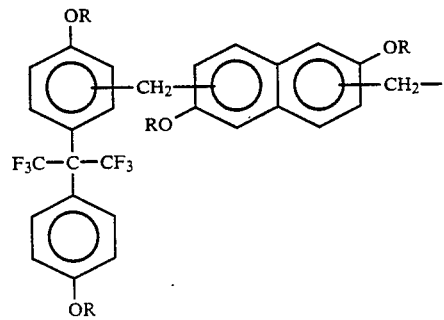

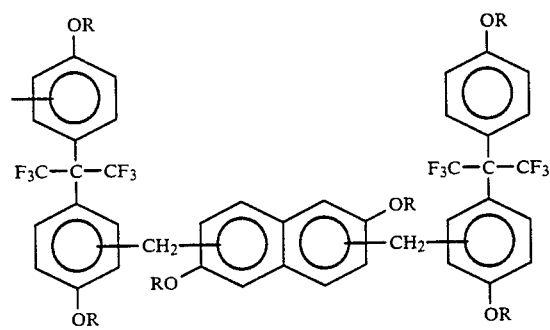

wherein R is —H and wherein said fourth resin is present in an amount of about 50 to 80%, by weight, based on the total weight of all phenolic resins present in said composition.

12. The composition according to claim 6, wherein said inorganic filler contains on the surface thereof a silane coupling agent and said composition further comprises a wax.

13. A cured product produced by thermosetting the thermosetting resin composition of claim 4.

14. A cured product produced by thermosetting the thermosetting resin composition of claim 5.

15. A cured product produced by thermosetting the thermosetting resin composition of claim 6.

16. A cured product produced by thermosetting the thermosetting resin composition of claim 11.

17. A cured product produced by thermosetting the thermosetting resin composition of claim 12.

* * * * *